US011749993B2

(12) United States Patent
Demissie et al.

(10) Patent No.: US 11,749,993 B2
(45) Date of Patent: *Sep. 5, 2023

(54) METHOD TO OVERCOME ELECTRICAL CIRCUIT VOLTAGE AND CURRENT LIMITATIONS

(71) Applicant: SCHNEIDER ELECTRIC IT CORPORATION, Foxboro, MA (US)

(72) Inventors: Eyob Demissie, Westford, MA (US); Kaushal J. Patel, Lowell, MA (US); Kenneth A. Colby, Jr., Hollis, NH (US); Steven Allen Diggins, Merrimack, NH (US)

(73) Assignee: SCHNEIDER ELECTRIC IT CORPORATION, Foxboro, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/811,900

(22) Filed: Jul. 12, 2022

(65) Prior Publication Data

US 2023/0032164 A1     Feb. 2, 2023

Related U.S. Application Data

(63) Continuation of application No. 17/075,809, filed on Oct. 21, 2020, now Pat. No. 11,418,033.

(51) Int. Cl.
*H02J 3/16* (2006.01)
*H02J 3/32* (2006.01)

(52) U.S. Cl.
CPC .............. *H02J 3/16* (2013.01); *H02J 3/32* (2013.01); *H02J 2310/60* (2020.01)

(58) Field of Classification Search
CPC .. H02J 3/16; H02J 3/32; H02J 2310/60; H02J 9/062; H02J 2310/12; H02J 1/08;
(Continued)

(56) References Cited

U.S. PATENT DOCUMENTS 10,521,001 B2   12/2019  Wilcox et al.
11,418,033 B2 *  8/2022  Demissie ................. H02J 3/32
(Continued)

FOREIGN PATENT DOCUMENTS

EP        2889985 A2     7/2015

OTHER PUBLICATIONS

Extended European Search Report from corresponding European Application No. 21209933.6 dated Jul. 15, 2022.

*Primary Examiner* — Richard Tan
(74) *Attorney, Agent, or Firm* — Lando & Anastasi, LLP

(57) ABSTRACT

A power converter system including an input configured to receive input AC power from an input power source, the input power source having a peak voltage limit, at least one output configured to provide output power to at least one load, a charger coupled to the input and configured to convert the input AC power into first DC power, a DC bus configured to receive the first DC power, at least one power converter configured to convert DC power from the DC bus into the output power, and an auxiliary power source coupled to the DC bus and configured to provide second DC power to the DC bus to supplement the first DC power provided by the charger in response to a voltage demand of the at least one load exceeding the peak voltage limit of the input power source.

20 Claims, 5 Drawing Sheets

(58) Field of Classification Search
CPC .......... H02J 7/0068; H02J 7/04; H02J 7/0047; H02J 2207/20
USPC ........................................................ 307/52
See application file for complete search history.

(56) References Cited

U.S. PATENT DOCUMENTS

| | | |
|---|---|---|
| 2002/0153778 A1 | 10/2002 | Oughton |
| 2004/0084965 A1 | 5/2004 | Welches et al. |
| 2008/0252144 A1 | 10/2008 | Wang et al. |
| 2012/0056481 A1 | 3/2012 | Corhodzic et al. |
| 2012/0086269 A1* | 4/2012 | Nakano .................. H02J 9/062 307/23 |
| 2012/0181871 A1 | 7/2012 | Johansen et al. |
| 2020/0366101 A1* | 11/2020 | Lim ........................ H02J 3/381 |
| 2021/0098991 A1* | 4/2021 | Nishimura .............. H02J 9/061 |
| 2021/0159723 A1 | 5/2021 | Ho et al. |

\* cited by examiner

METHOD TO OVERCOME ELECTRICAL CIRCUIT VOLTAGE AND CURRENT LIMITATIONS

CROSS-REFERENCE TO RELATED APPLICATIONS

This application claims priority under 35 U.S.C. § 120 as a continuation of U.S. application Ser. No. 17/075,809, titled A NOVEL METHOD TO OVERCOME ELECTRICAL CIRCUIT VOLTAGE AND CURRENT LIMITATIONS, filed on Oct. 21, 2020, which is hereby incorporated by reference in its entirety.

BACKGROUND

1. Field of Invention

The present disclosure relates generally to power converter systems.

2. Discussion of Related Art

Typical electrical wiring systems are configured to provide a standard power input (e.g., 120V, 15 A) to standard electrical devices. However, non-standard electrical devices may require power greater than the standard power input. For example, some non-standard electrical devices have a peak power demand that is higher than the standard power input and higher than the average power consumption of the device. As such, to power non-standard electrical devices that operate with higher peak current and/or voltage levels than standard devices, the electrical wiring system may have to be reconfigured. In such cases, the electrical wiring system can be redesigned or replaced altogether to support the higher peak power demand; however, this can be relatively time-consuming and expensive.

SUMMARY

At least one aspect of the present disclosure is directed to a power converter system including an input configured to receive input AC power from an input power source, the input power source having a peak voltage limit, at least one output configured to provide output power to at least one load, a charger coupled to the input and configured to convert the input AC power into first DC power having a first voltage level, a DC bus coupled to the charger and configured to receive the first DC power having the first voltage level, at least one power converter coupled to the DC bus and configured to convert DC power from the DC bus into the output power and provide the output power to the at least one load, and an auxiliary power source coupled to the DC bus and configured to provide second DC power having the first voltage level to the DC bus to supplement the first DC power provided by the charger in response to a voltage demand of the at least one load exceeding the peak voltage limit of the input power source.

In one embodiment, the auxiliary power source is configured to receive the first DC power having the first voltage level from the DC bus for charging while the voltage demand of the at least one load is less than the peak voltage limit of the input power source. In some embodiments, the power converter system includes a power flow control module coupled to the charger, the auxiliary power source, and the DC bus, and a controller configured to monitor the voltage demand of the at least one load with respect to the peak voltage limit of the input power source, control, in response to the voltage demand of the at least one load being less than the peak voltage limit of the input power source, the power flow control module to provide the first DC power having the first voltage level from the DC bus to the auxiliary power source, and control, in response to the voltage demand of the at least one load exceeding the peak voltage limit of the input power source, the power flow control module to draw the second DC power having the first voltage level from the auxiliary power source.

In certain embodiments, the controller is configured to adjust the peak voltage limit based on at least one of a variability of the input power source, utility costs, and user preferences. In various embodiments, the at least one power converter includes at least one inverter configured to convert DC power from the DC bus into AC output power. In some embodiments, a voltage level of the AC output power is greater than the peak voltage limit of the input power source. In one embodiment, the at least one power converter includes a DC/DC converter coupled in series with the inverter and configured to convert DC power from the DC bus into DC power having a different voltage level.

In some embodiments, the at least one power converter includes at least one DC/DC converter configured to convert DC power from the DC bus into DC output power. In certain embodiments, a voltage level of the DC output power is greater than the peak voltage limit of the input power source. In various embodiments, the auxiliary power source includes one or more batteries.

Another aspect of the present disclosure is directed to a power converter system including an input configured to receive input AC power from an input power source, the input power source having a peak current limit, at least one output configured to provide output power to at least one load, a charger coupled to the input and configured to convert the input AC power into first DC power having a first voltage level, a DC bus coupled to the charger and configured to receive the first DC power having the first voltage level, at least one power converter coupled to the DC bus and configured to convert DC power from the DC bus into the output power and provide the output power to the at least one load, and an auxiliary power source coupled to the DC bus and configured to provide second DC power having the first voltage level to the DC bus to supplement the first DC power provided by the charger in response to a current demand of the at least one load exceeding the peak current limit of the input power source.

In one embodiment, the auxiliary power source is further configured to receive the first DC power having the first voltage level from the DC bus for charging while the current demand of the at least one load is less than the peak current limit of the input power source. In some embodiments, the power converter system includes a power flow control module coupled to the charger, the auxiliary power source, and the DC bus, and a controller configured to monitor the current demand of the at least one load with respect to the peak current limit of the input power source, control, in response to the current demand of the at least one load being less than the peak current limit of the input power source, the power flow control module to provide the first DC power having the first voltage level from the DC bus to the auxiliary power source, and control, in response to the current demand of the at least one load exceeding the peak current limit of the input power source, the power flow control module to draw the second DC power having the first voltage level from the auxiliary power source.

In certain embodiments, the controller is configured to adjust the peak current limit based on at least one of a variability of the input power source, utility costs, and user preferences. In various embodiments, the at least one power converter includes at least one inverter configured to convert DC power from the DC bus into AC output power. In some embodiments, a current level of the AC output power is greater than the peak current limit of the input power source. In one embodiment, the at least one power converter includes a DC/DC converter coupled in series with the inverter and configured to convert DC power from the DC bus into DC power having a different voltage level.

In some embodiments, the at least one power converter includes at least one DC/DC converter configured to convert DC power from the DC bus into DC output power. In one embodiment, a current level of the DC output power is greater than the peak current limit of the input power source.

Another aspect of the present disclosure is directed to a non-transitory computer-readable medium storing thereon sequences of computer-executable instructions for operating a power converter system. The sequences of computer-executable instructions including instructions that instruct at least one processor to control the power converter system to receive input AC power at an input from an input power source, the input power source having a peak voltage limit and a peak current limit, operate a charger coupled to the input to convert the input AC power into first DC power having a first voltage level, provide the first DC power having the first voltage level to a DC bus, operate at least one power converter coupled to the DC bus to convert DC power from the DC bus into output power and provide the output power to at least one load, and in response to a voltage or current demand of the at least one load exceeding the peak voltage limit or the peak current limit of the input power source, providing second DC power having the first voltage level to the DC bus from an auxiliary power source to supplement the first DC power provided by the charger.

Another aspect of the present disclosure is directed to a method of assembling a power converter system. The method includes providing a charger configured to be coupled to an input power source, the charger configured to receive input AC power and convert the input AC power into first DC power having a first voltage level, coupling a DC bus to the charger, the DC bus configured to receive the first DC power having the first voltage level, coupling at least one power converter to the DC bus, the at least one power converter configured to convert DC power from the DC bus into output power and provide the output power to at least one load, and coupling an auxiliary interface to the DC bus, the auxiliary interface configured to be coupled to an auxiliary power source, to receive second DC power having the first voltage level from the auxiliary power source, and to provide the second DC power to the DC bus to supplement the first DC power provided by the charger in response to a voltage or current demand of the at least one load exceeding a peak voltage limit or a peak current limit of the input power source.

Another aspect of the present disclosure a method for operating a power converter system. The method includes receiving input AC power at an input from an input power source, the input power source having a peak power limit corresponding to an input voltage level and an input current level of the input AC power, operating a charger coupled to the input to convert the input AC power into first DC power having a first voltage level, providing the first DC power having the first voltage level to a DC bus, operating at least one power converter coupled to the DC bus to convert DC power from the DC bus into output power and provide the output power to at least one load, and in response to a power demand of the at least one load exceeding the peak power limit of the input power source, providing second DC power having the first voltage level to the DC bus from an auxiliary power source to supplement the first DC power provided by the charger.

In one embodiment, the peak power limit corresponds to an input voltage level and an input current level of the input AC power. In some embodiments, the method includes adjusting the peak power limit based on at least one of a variability of the input power source, utility costs, and user preferences. In certain embodiments, the method includes providing the first DC power having the first voltage level from the DC bus to charge the auxiliary power source while the power demand of the at least one load is less than the peak power limit of the input power source. In various embodiments, the method includes monitoring the power demand of the at least one load with respect to the peak power limit of the input power source, controlling, in response to the power demand of the at least one load being less than the peak power limit of the input power source, the power flow control module to provide the first DC power having the first voltage level from the DC bus to auxiliary power source, and controlling, in response to the power demand of the at least one load exceeding the peak power limit of the input power source, a power flow control module to draw the second DC power having the first voltage level from the auxiliary power source.

In some embodiments, operating the at least one power converter to convert DC power from the DC bus into the output power further includes operating at least one inverter configured to convert DC power from the DC bus into AC output power. In various embodiments, the at least one inverter is operated such that at least one of a voltage level and a current level of the AC output power is greater than the input voltage level and/or the input current level of the input AC power. In certain embodiments, operating the at least one power converter to convert DC power from the DC bus into the output power further includes operating at least one DC/DC converter to convert DC power from the DC bus into DC output power. In one embodiment, the at least one DC/DC converter is operated such that at least one of a voltage level and a current level of the DC output power is greater than the input voltage level and/or the input current level of the input AC power.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION

Figure 1:
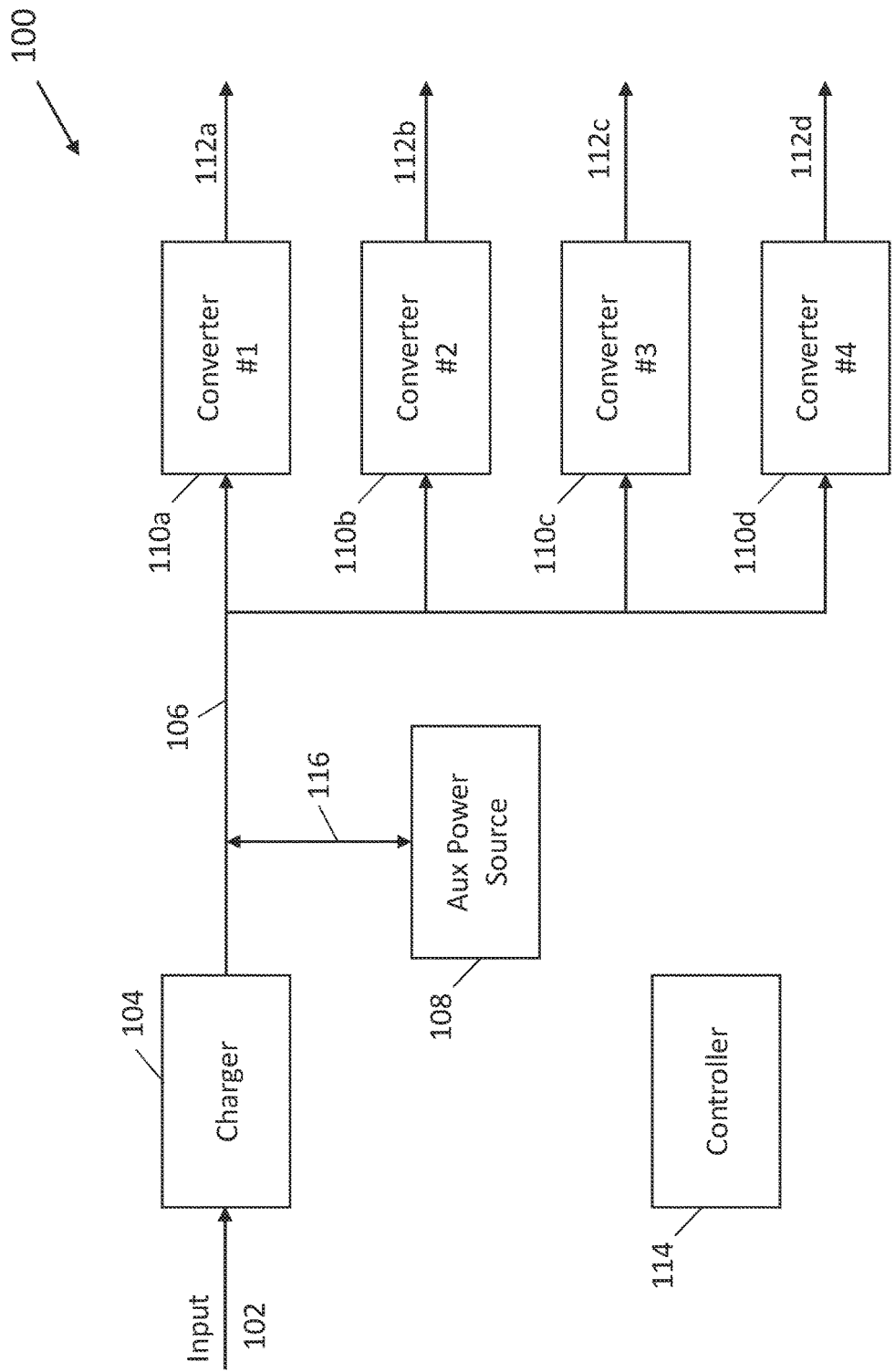
FIG. 1 is a functional block diagram of a power converter system in accordance with aspects described herein.

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

Electrical wiring systems are typically configured to provide power from a power source (e.g., utility grid) to electrical devices within/outside buildings. As discussed above, in at least one example, standard electrical devices are devices that operate with peak power demands that are lower than the maximum power provided by the standard input power. These standard electrical devices can be plugged into power outlets of the electrical wiring system to receive the standard input power (e.g., 120V, 15 A) from the wiring infrastructure. In some examples, each electrical device plugged into a standard power output includes a power converter that converts the standard input power into AC or DC device power. In other examples, each electrical device can include an external power adapter configured to convert the standard input power into the device power.

In some examples, non-standard electrical devices are devices that can operate with peak power demands that exceed the maximum power provided by the standard input power. To support such non-standard electrical devices that can operate with higher peak current and/or voltage levels than are provided by the standard input power, the electrical wiring system may be redesigned or replaced to provide the higher peak power capabilities. Such efforts can be expensive and time-consuming. As such, it may be advantageous to use alternative methods for increasing the peak power capability of standard electrical wiring systems and power sources.

A power converter system configured to increase the peak power capability of standard electrical systems is provided herein. In at least one embodiment, the power converter system includes an auxiliary power source configured to supplement input power provided from an input power source. In one example, the power converter system can provide output power having a peak power level that exceeds the peak power limit of the input power source.

FIG. 1 is a functional block diagram of a power converter system 100 in accordance with aspects described herein. As shown, the power converter system 100 includes an input 102, a charger 104, a DC bus 106, an auxiliary power source 108, a plurality of power converters 110, and a plurality of outputs 112. In some examples, the power converter system 100 includes a controller 114 coupled to and configured to operate the charger 104 and the plurality of power converters 110.

In one example, the auxiliary power source 108 includes one or more batteries. As shown, the auxiliary power source 108 is coupled to the DC bus 106 via an auxiliary interface 116. In some examples, the auxiliary power source 108 is internal to the power converter system 100; however, in other examples, the auxiliary power source 108 may be external to the power converter system 100.

In one example, the plurality of power converters 110 includes a first power converter 110a, a second power converter 110b, a third power converter 110c, and a fourth power converter 110d; however, in other examples, the plurality of power converters 110 can include a different number of power converters. Likewise, in one example, the plurality of outputs 112 includes a first output 112a coupled to the first power converter 110a, a second output 112b coupled to the second power converter 110b, a third output 112c coupled to the third power converter 110c, and a fourth output 112d coupled to the fourth power converter 112d. In other examples, the plurality of outputs 112 can include a different number of outputs. For example, the power converter system 100 may have more outputs than power converters. In such examples, two or more outputs of the plurality of outputs 112 can be coupled to the same power converter of the plurality of power converters 110 via an output switch.

As shown, the input 102 is coupled to an input of the charger 104 and an output of the charger 104 is coupled to the DC bus 106. The auxiliary power source 108 is coupled to the DC bus 106. Each converter of the plurality of converters 110 is coupled to the DC bus 106. In one example, each power converter is coupled to the DC bus 106 in parallel. In some examples, two or more of the power converters can be coupled to the DC bus 106 in series. As described above, each power converter of the plurality of power converters 110 is coupled to at least one output of the plurality of outputs 112.

In one example, the input 102 is configured to receive input AC power from an input power source (e.g., a utility mains AC power supply). In some examples, the input 102 is connected to a power outlet of a standard electrical wiring system to receive the input AC power. The charger 104 converts the input AC power into DC power and provides the DC power to the DC bus 106. In one example, the charger 104 can provide DC power to the DC bus 106 having a voltage level corresponding to a charging voltage of the auxiliary power source 108. For example, the input AC power may have an input voltage level (e.g., 120V) and the charger 104 may provide DC power to the DC bus 106 having a reduced voltage level (e.g., 46-58V). Likewise, the charger 104 can provide DC power to the DC bus 106 having a current level corresponding to a charging current of the auxiliary power source 108. For example, the input AC power may have an input current level (e.g., 15 A) and the charger 104 may provide DC power to the DC bus 106 having a reduced current level (e.g., 10 A). In some examples, the charger 104 is configured to adjust the voltage and/or current levels of the DC power provided to the DC bus 106 based on specific charging parameters of the auxiliary source 108.

The auxiliary power source 108 is configured to receive and provide DC power to the DC bus 106. The auxiliary power source 108 can receive DC power from the DC bus 106 for charging in a first state of the power converter system 100 and provide power to the DC bus 106 to supplement the DC power provided by the charger 104 in a second state of the power converter system 100. In some examples, the auxiliary power source 108 is coupled in series with the DC bus 106. For example, a first portion of the DC bus 106 can be coupled between the charger 104 and an input port of the auxiliary power source 108. Likewise, a second portion of the DC bus 106 can be coupled between an output port of the auxiliary power source 108 and the plurality of converters 110.

Each power converter of the plurality of power converters 110 is configured to receive DC power from the DC bus 106 and convert the DC power into output power. In one example, each power converter of the plurality of power converters 110 is configured as a DC/DC converter to provide output DC power. In other examples, each power converter of the plurality of power converters 110 is configured as a DC/AC inverter to provide output AC power. In some examples, a first portion of the plurality of power converters 110 (e.g., 110a, 110b) can be configured as DC/DC converters and a second portion of the plurality of power converters 110 (e.g., 110c, 110d) can be configured as inverters. As such, the configuration of each power converter may correspond to a desired configuration of the plurality of outputs 112. For example, each output of the plurality of outputs 112 may have a configuration (e.g., DC or AC) based on the types of loads (i.e., devices) connected to each output.

Figure 2:
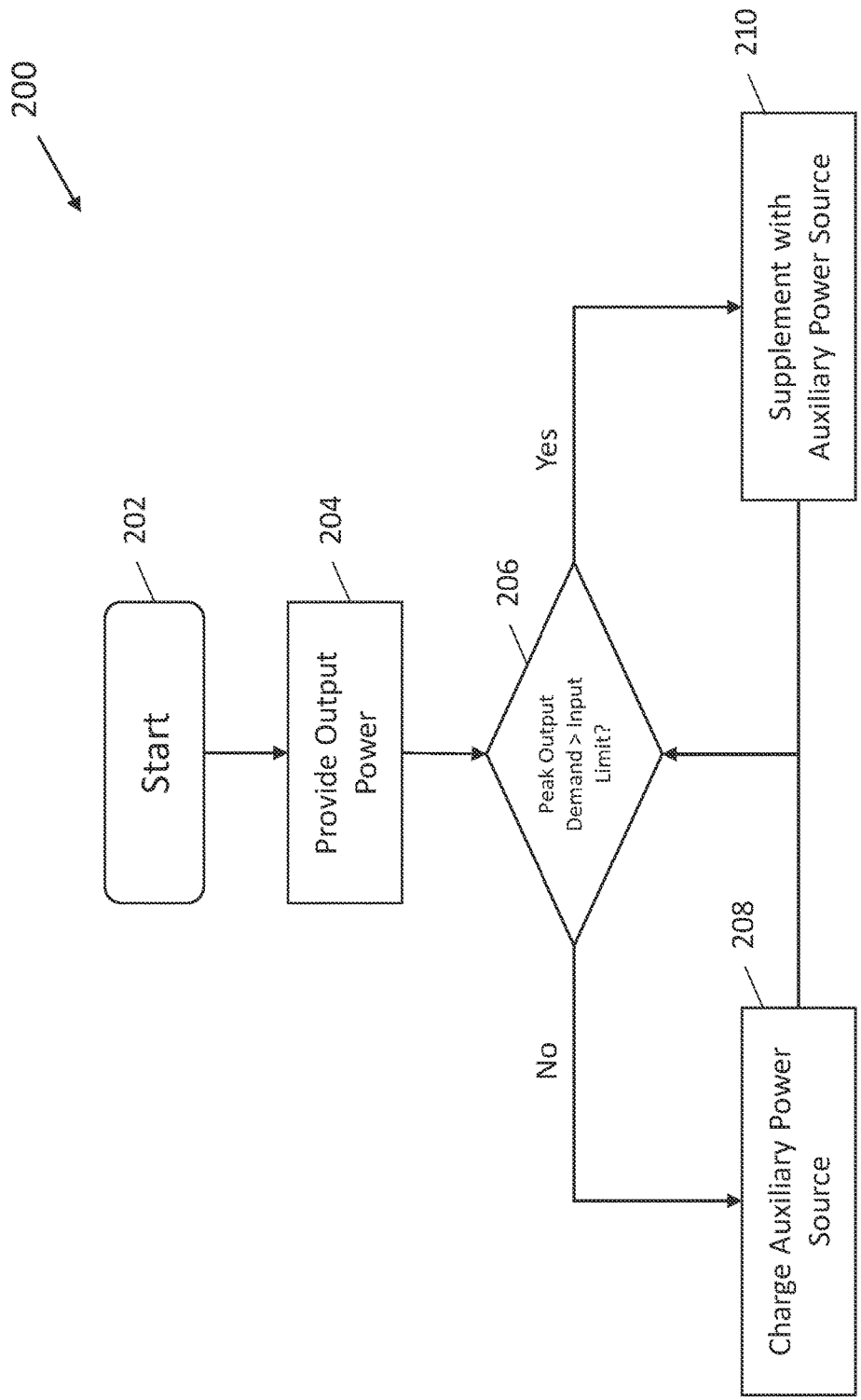
FIG. 2 is a flow diagram corresponding to operation of a power converter system in accordance with aspects described herein.

FIG. 2 is a flow chart illustrating a method 200 for operating power converter systems in accordance with aspects described herein. In one example, the control method 200 corresponds to operation of the power converter system 100 in the first and second states described above. In some examples, at least a portion of the control method 200 can be carried out by the controller 114 of the power converter system 100.

At block 202, the method 200 begins and the power converter 100 receives input AC power at the input 102. At block 204, the controller 114 operates the charger 104 to convert the input AC power into DC power and provide the DC power to the DC bus 106. The plurality of converters 110 receive the DC power from the DC bus 106 and the controller 114 operates the plurality of power converters 110 to provide output power to the plurality of outputs 112. As described above, each of power converter of the plurality of power converters 110 may be configured as a DC/DC converter to provide output DC power or as an inverter to provide output AC power.

At block 206, the peak output power demand by the plurality of outputs 112 is compared to the peak input power limit of the input power source (e.g., grid). The peak power limit of the input power source corresponds to a fixed power limit (e.g., 1200 W) defined by the input voltage and current levels (e.g., 120V, 15 A) provided by the input power source. As such, the peak power limit of the input source may correspond to a peak voltage limit (e.g., 120V) and/or a peak current limit (e.g., 15 A). Likewise, the peak output power demand at each output corresponds to the type of load or device coupled to the output. In some examples, the peak output power demand corresponds to a peak output voltage demand and/or a peak output current demand.

At block 208, in response to the peak output power demand by the plurality of outputs 112 being less than the peak input power limit, the power converter system 100 operates in the first state. During the first state, the auxiliary power source 108 can receive (or draw) DC power from the DC bus 106 for charging while DC power is provided to the plurality of power converters 110 to support the peak output power demand. In one example, if the auxiliary power source 108 is fully charged, the auxiliary power source 108 can operate in an idle state (i.e., not receiving or drawing DC power). In some examples, if fully charged, the auxiliary power source 108 can be disconnected (e.g., via a switch) from the DC bus 106. In some examples, while the auxiliary power source 108 is charging (or idling) and the plurality of power converters 110 are providing output power to the plurality of outputs 112, the power converter system 100 returns to block 206 to continuously monitor the peak output power demand with respect to the peak input power limit.

At block 210, in response to the peak output power demand by the plurality of outputs 112 being greater than the peak input power limit, the power converter system 100 operates in the second state. During the second state, the auxiliary power source 108 provides DC power to the DC bus 106 to supplement the DC power provided by the charger 104. In one example, the amount of supplemental DC power provided by the auxiliary power source 108 to the DC bus 106 corresponds to the difference between the peak output power demand and the input power limit. For example, if the input power limit is 1200 W and the peak output power demand is 1250 W, the auxiliary power source 108 can provide an additional 50 W of DC power to supplement the DC power provided by the charger 104. While the auxiliary power source 108 is providing supplemental DC power to the DC bus 106 and the plurality of power converters 110 are providing output power to the plurality of outputs 112, the power converter system 100 returns to block 206 to continuously monitor the peak output power demand with respect to the peak input power limit.

As described above, the peak output power demand corresponds to the peak power levels of devices coupled to the outputs. As such, by providing supplemental DC power from the auxiliary power source 108 to the DC bus 106, the power converter system 100 can support devices that operate with peak power levels exceeding the input power limit. In some examples, the power converter system 100 is transitioned between the first and second states to support the peak output power demand of the plurality of outputs 112 while maintaining an average output power demand less than the maximum power provided by the input power source.

In one example, the power converter system 100 is configured to passively transition between the first and second states (i.e., without controller/operator intervention). For example, the auxiliary power source 108 can be configured to automatically draw DC power from the DC bus 106 for charging when the peak output power demand of the plurality of outputs 112 is less than the peak input power limit. Likewise, the auxiliary power source 108 can automatically provide DC power to the DC bus 106 when the peak output power demand exceeds the peak input power limit.

Figure 3:
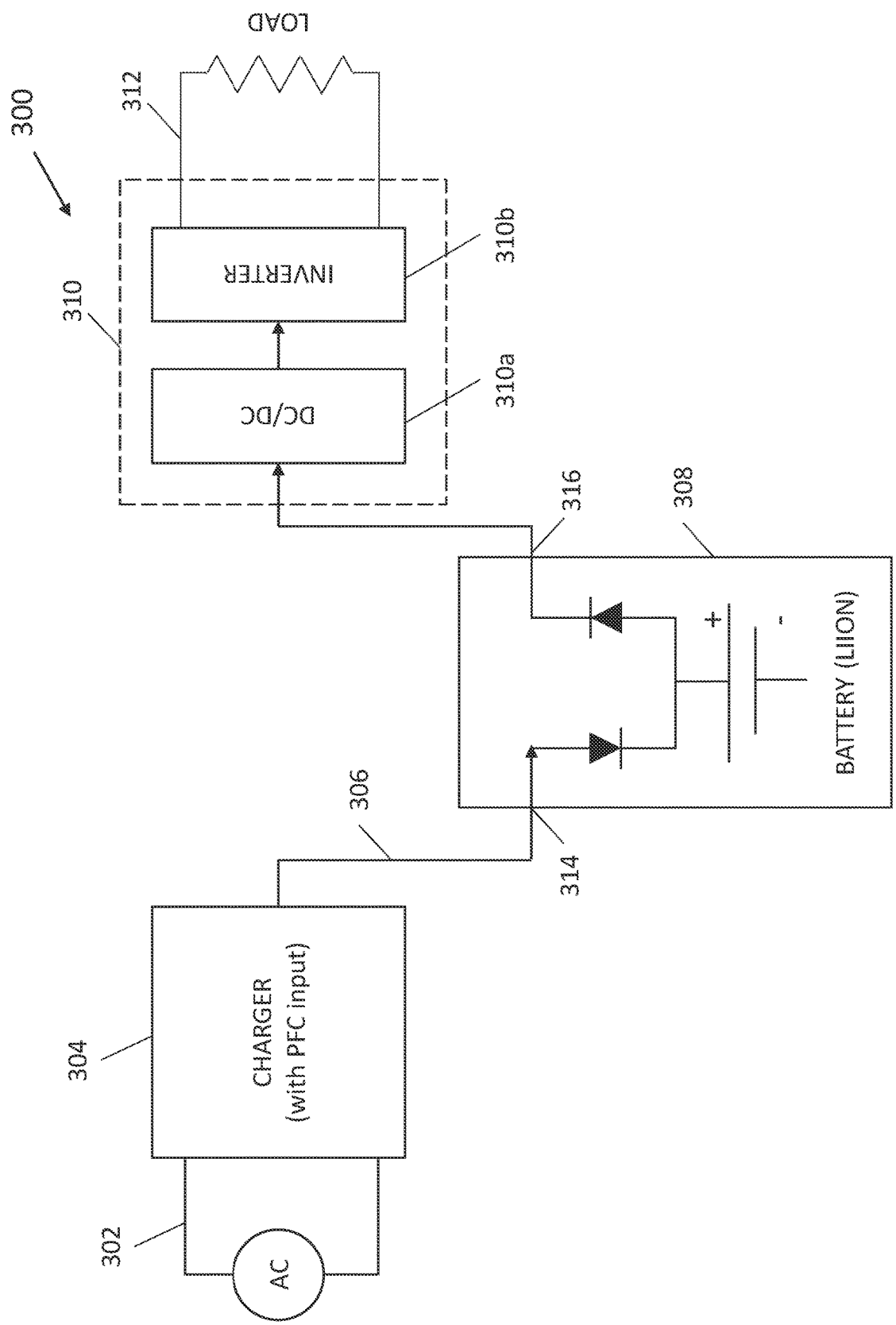
FIG. 3 is a schematic diagram of a power converter system in accordance with aspects described herein.

FIG. 3 illustrates a schematic diagram of power converter system 300 in accordance with aspects described herein. As shown, the power converter system 300 includes an input 302, a charger 304, a DC bus 306, a battery 308, a power converter 310, and an output 312. In one example, the battery 308 corresponds to the auxiliary power source 108 of the power converter system 100. Likewise, the power converter 310 corresponds to a power converter of the plurality of power converters 110 and the output 312 corresponds to an output of the plurality of outputs 112 of the power converter system 100.

As shown, the power converter 310 includes a DC/DC converter 310a and an inverter 310b coupled in series. In one example, the DC/DC converter 310a is coupled to the DC bus 306 and configured to boost the DC power received from the DC bus 306, e.g., from a battery charging voltage level to an output voltage level. In other examples, the DC/DC converter 310a is configured to provide DC power having a voltage level lower than the battery charging level. The inverter 310b receives the DC power from the DC/DC converter 310a and converts the DC power into output AC power.

The battery 308 includes an input port 314 and an output port 316. In one example, the input port 314 is coupled to the charger 304 via a first portion of the DC bus 306 and the output port 316 is coupled to the power converter 310 via a second portion of the DC bus 306. As such, the battery 308 is coupled to the DC bus 306 between the charger 304 and the power converter 310. In some examples, the battery 308 includes a single battery module coupled to the input and output ports 314, 316; however, in other examples, the battery 308 can include a plurality of battery modules coupled to the input and output ports 314, 316.

As described above, the power converter system 300 is configured such that the battery 308 (i.e., auxiliary power source 108) can automatically provide and/or receive DC power based on the peak output power demand at the output 312. For example, the power output of the charger 304 is fixed at the peak input power limit (e.g., 1200 W). In the first state of the power converter system 300, when the peak output power demand at the output 312 is less than the peak input power limit, the battery 308 can draw DC power from the charger 104 via the input port 314 for charging. Likewise, in the second state of the power converter system 300, when the peak output power demand at the output 312 exceeds the peak input power limit, supplemental DC power is drawn from the battery 308 via the output port 316. As such, the power converter system 300 can seamlessly transition between the first and second states without operator/controller intervention.

Figure 4:
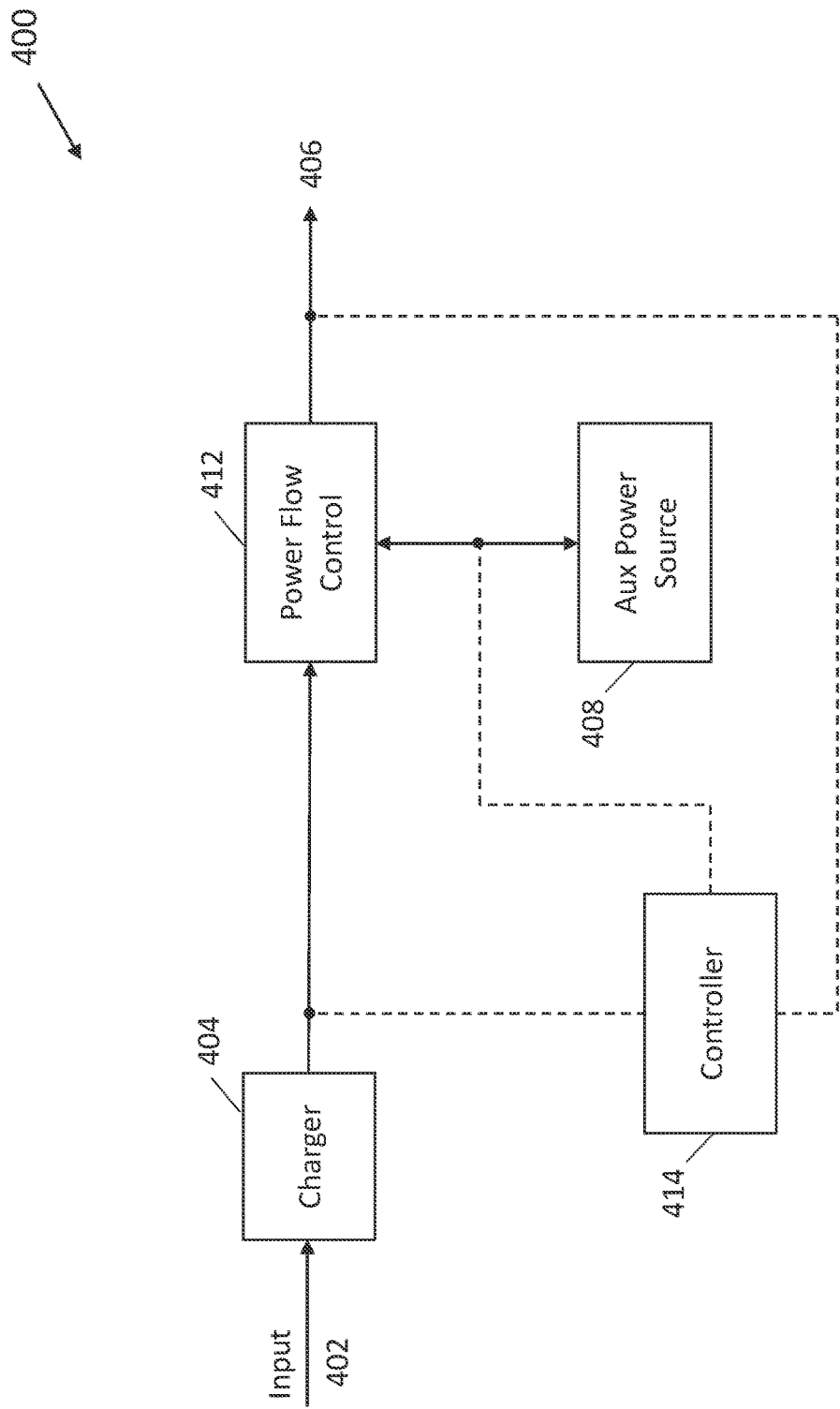
FIG. 4 is a functional block diagram of a power converter system in accordance with aspects described herein.

In other examples, active control approaches can be used to transition the power converter system 100 between the first and second states. For example, FIG. 4 illustrates a portion of a power converter system 400 in accordance with aspects described herein. As shown, the power converter system 400 includes an input 402, a charger 404, and a DC bus 406. In one example, the power converter system 400 is similar to the power converter system 100 of FIG. 1, except the power converter system 400 includes a power flow control module 412 and a controller 414. While not shown, the power converter system 400 includes a plurality of power converters (i.e., the plurality of power converters 110) and a plurality of outputs (i.e., the plurality of outputs 112) coupled to the DC bus 406. In some examples, the controller 414 corresponds to the controller 114 of the power converter system 100; however, in other examples, the controller 414 may be a different/separate controller.

The power flow control module 412 is coupled to the output of the charger 404, the DC bus 406, and the auxiliary power source 408. Likewise, the controller 414 is coupled to the power flow control module 412, the output of the charger 404, the DC bus 406, and the auxiliary power source 408. In one example, the controller 414 includes current sensors configured to sense current at the output of the charger 404, the input/output of the auxiliary power source 408, and the DC bus 406. As such, the controller 414 can monitor, in real-time, the DC power provided by the charger 404, the DC power provided/drawn at the auxiliary power source 408, and the DC power drawn by the plurality of outputs coupled to the DC bus 406.

Similar to the examples of power converter systems described above, the power converter system 400 can be configured to transition between the first state and the second state based on a fixed peak input power limit (e.g., 1200 W). However, in some examples, the controller 414 is configured to dynamically set the peak input power limit based on the real-time monitoring of DC power. For example, one or more variable power sources (e.g., solar panel, wind turbine, etc.) may also be coupled to the input 402, and the controller 414 may adjust (i.e., raise or lower) the peak input power limit based on the amount of DC power provided by the charger 404 at any given time. In other examples, the controller 414 can adjust the peak input power limit based on additional factors. For example, it may be desirable to restrict grid power consumption during certain time periods (e.g., nights, weekends, etc.) to reduce utility costs. As such, the controller 414 may adjust the peak input power limit to reduce grid power consumption accordingly.

In some examples, based on the DC power monitoring and the peak input power limit, the controller 414 is configured to send commands to the power flow control module 412 to operate the power converter system 400 in the first and second states. For example, when the peak output power demand at the plurality of outputs is less than the peak input power limit, the controller 414 operates the power converter system 400 in the first state. In the first state, the controller 414 sends a command instructing the power flow control module 412 to provide DC power from the charger 404 to the DC bus 406. At the same time, the power flow control module 412 is commanded by the controller 414 to provide excess DC power from the charger 404 to the auxiliary power source 408 for charging. Likewise, when the peak output power demand at the plurality of outputs exceeds the peak input power limit, the controller 414 operates the power converter system 400 in the second state. In the second state, the controller 414 sends a command instructing the power flow control module 412 to provide DC power from the charger 404 to the DC bus 406. At the same time, the power flow module 412 is commanded by the controller 414 to draw supplemental DC power from the auxiliary power source 408 to support the DC power provided by the charger 404.

Figure 5:
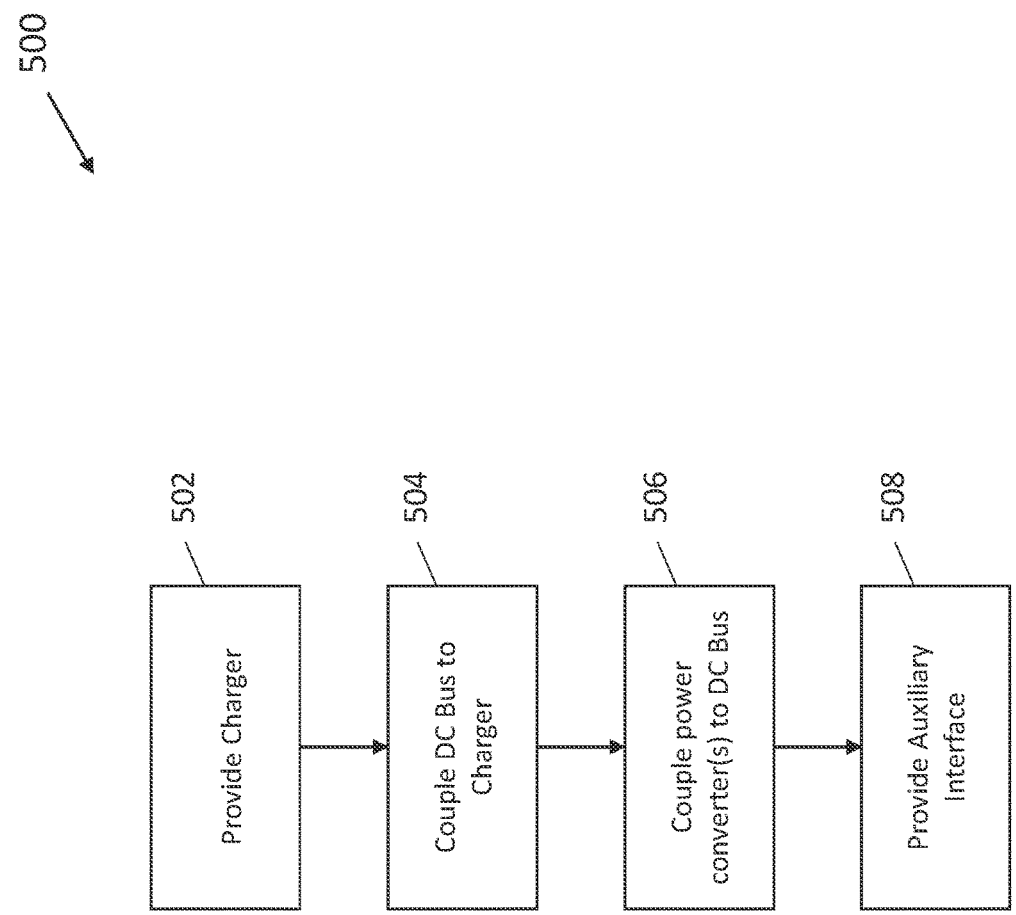
FIG. 5 is a flow diagram corresponding to the assembly of a power converter system in accordance with aspects described herein.

FIG. 5 illustrates a method 500 of assembling a power converter system in accordance with aspects described herein. In one embodiment, the method 500 can be utilized to assemble the power converter system 100 of FIG. 1, for example.

At step 502, the charger 104 is provided. In one example, the charger 104 is configured to be coupled to an input power source (e.g., via input 102) to receive input AC power and convert the input AC power into first DC power having the first voltage level. At step 504, the DC bus 106 is coupled to the charger 104. In some examples, the DC bus 106 is coupled to the output charger 104 and configured to receive the first DC power having the first voltage level. At step 506, one or more power converters (i.e., plurality of power converters 110) are coupled to the DC bus 106. In one example, the plurality of power converter 110 are configured to convert DC power from the DC bus into output power and provide the output power to at least one load (e.g., via the plurality of outputs 112). At step 508, the auxiliary interface 116 is coupled to the DC bus 106. In some examples, the auxiliary interface 116 is configured to be coupled to the auxiliary power source 108. In certain examples, the auxiliary interface 116 is configured to receive second DC power having the first voltage level from the auxiliary power source 108 and provide the second DC power to the DC bus 106 to supplement the first DC power provided by the charger 104 in response to a voltage or current demand of the at least one load exceeding a peak voltage limit or a peak current limit of the input power source.

As described above, a power converter system configured to increase the peak power capability of standard electrical systems is provided herein. In at least one embodiment, the power converter system includes an auxiliary power source configured to supplement input power provided from an input power source. In one example, the power converter system can provide output power having a peak power level that exceeds the peak power limit of the input power source.

Having thus described several aspects of at least one embodiment of this invention, it is to be appreciated various alterations, modifications, and improvements will readily occur to those skilled in the art. Such alterations, modifications, and improvements are intended to be part of this disclosure and are intended to be within the spirit and scope of the invention. Accordingly, the foregoing description and drawings are by way of example only.

What is claimed is:

1. A method for operating a power converter system, the method comprising:
   receiving input AC power at an input from an input power source, the input power source having a peak voltage limit;
   operating a charger coupled to the input to convert the input AC power into first DC power having a first voltage level;
   providing the first DC power having the first voltage level to a DC bus;
   operating at least one power converter coupled to the DC bus to convert DC power from the DC bus into output power and provide the output power to at least one load; and
   in response to a voltage demand of the at least one load exceeding the peak voltage limit of the input power source, providing second DC power having the first voltage level to the DC bus from an auxiliary power source to supplement the first DC power provided by the charger.

2. The method of claim 1, further comprising receiving, with the auxiliary power source, the first DC power having the first voltage level from the DC bus for charging while the voltage demand of the at least one load is less than the peak voltage limit of the input power source.

3. The method of claim 2, further comprising:
   monitoring the voltage demand of the at least one load with respect to the peak voltage limit of the input power source;
   controlling, in response to the voltage demand of the at least one load being less than the peak voltage limit of the input power source, a power flow control module to provide the first DC power having the first voltage level from the DC bus to the auxiliary power source; and
   controlling, in response to the voltage demand of the at least one load exceeding the peak voltage limit of the input power source, the power flow control module to draw the second DC power having the first voltage level from the auxiliary power source.

4. The method of claim 3, further comprising adjusting the peak voltage limit based on at least one of a variability of the input power source, utility costs, and user preferences.

5. The method of claim 1, further comprising converting DC power from the DC bus into AC output power.

6. The method of claim 5, further comprising converting DC power from the DC bus into DC power having a different voltage level.

7. The method of claim 1, further comprising converting DC power from the DC bus into DC output power.

8. A method for operating a power converter system, the method comprising:
   receiving input AC power at an input from an input power source, the input power source having a peak current limit;
   operating a charger coupled to the input to convert the input AC power into first DC power having a first voltage level;
   providing the first DC power having the first voltage level to a DC bus;
   operating at least one power converter coupled to the DC bus to convert DC power from the DC bus into output power and provide the output power to at least one load; and
   in response to a current demand of the at least one load exceeding the peak current limit of the input power source, providing second DC power having the first voltage level to the DC bus from an auxiliary power source to supplement the first DC power provided by the charger.

9. The method of claim 8, further comprising receiving, with the auxiliary power source, the first DC power having the first voltage level from the DC bus for charging while the current demand of the at least one load is less than the peak current limit of the input power source.

10. The method of claim 9, further comprising:
    monitoring the current demand of the at least one load with respect to the peak current limit of the input power source;
    controlling, in response to the current demand of the at least one load being less than the peak current limit of the input power source, a power flow control module to provide the first DC power having the first voltage level from the DC bus to the auxiliary power source; and
    controlling, in response to the current demand of the at least one load exceeding the peak current limit of the input power source, the power flow control module to draw the second DC power having the first voltage level from the auxiliary power source.

11. The method of claim 10, further comprising adjusting the peak current limit based on at least one of a variability of the input power source, utility costs, and user preferences.

12. The method of claim 8, further comprising converting DC power from the DC bus into AC output power.

13. The method of claim 12, further comprising converting DC power from the DC bus into DC power having a different voltage level.

14. The method of claim 8, further comprising converting DC power from the DC bus into DC output power.

15. A method for operating a power converter system, the method including:
  receiving input AC power at an input from an input power source, the input power source having a peak power limit;
  operating a charger coupled to the input to convert the input AC power into first DC power having a first voltage level;
  providing the first DC power having the first voltage level to a DC bus;
  operating at least one power converter coupled to the DC bus to convert DC power from the DC bus into output power and provide the output power to at least one load; and
  in response to a power demand of the at least one load exceeding the peak power limit of the input power source, providing second DC power having the first voltage level to the DC bus from an auxiliary power source to supplement the first DC power provided by the charger.

16. The method of claim 15, further comprising adjusting the peak power limit based on at least one of a variability of the input power source, utility costs, and user preferences.

17. The method of claim 15, further comprising providing the first DC power having the first voltage level from the DC bus to charge the auxiliary power source while the power demand of the at least one load is less than the peak power limit of the input power source.

18. The method of claim 15, further comprising:
  monitoring the power demand of the at least one load with respect to the peak power limit of the input power source;
  controlling, in response to the power demand of the at least one load being less than the peak power limit of the input power source, a power flow control module to provide the first DC power having the first voltage level from the DC bus to auxiliary power source; and
  controlling, in response to the power demand of the at least one load exceeding the peak power limit of the input power source, the power flow control module to draw the second DC power having the first voltage level from the auxiliary power source.

19. The method of claim 15, wherein operating the at least one power converter to convert DC power from the DC bus into the output power further includes operating at least one inverter to convert DC power from the DC bus into AC output power.

20. The method of claim 15, wherein operating the at least one power converter to convert DC power from the DC bus into the output power further includes operating at least one DC/DC converter to convert DC power from the DC bus into DC output power.

\* \* \* \* \*